Dec. 17, 1957 V. C. WILSON ET AL 2,816,860
MEANS FOR CONTROLLING A NUCLEAR REACTOR
Filed April 14, 1945 8 Sheets-Sheet 2
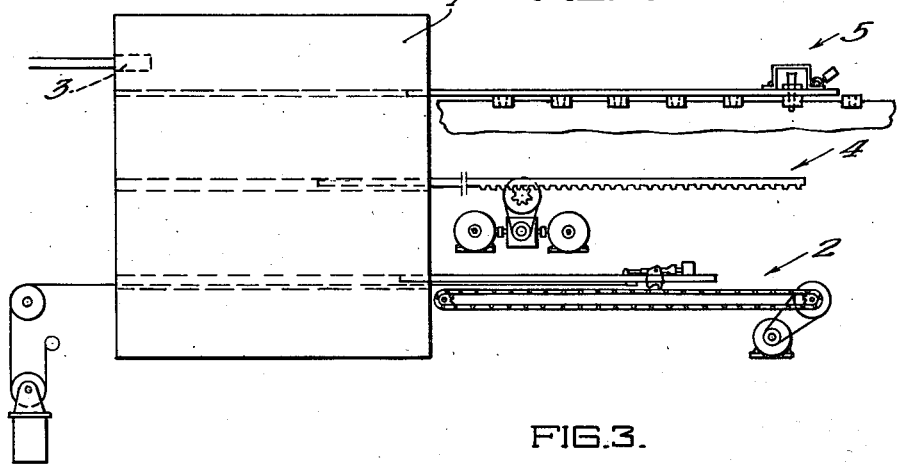
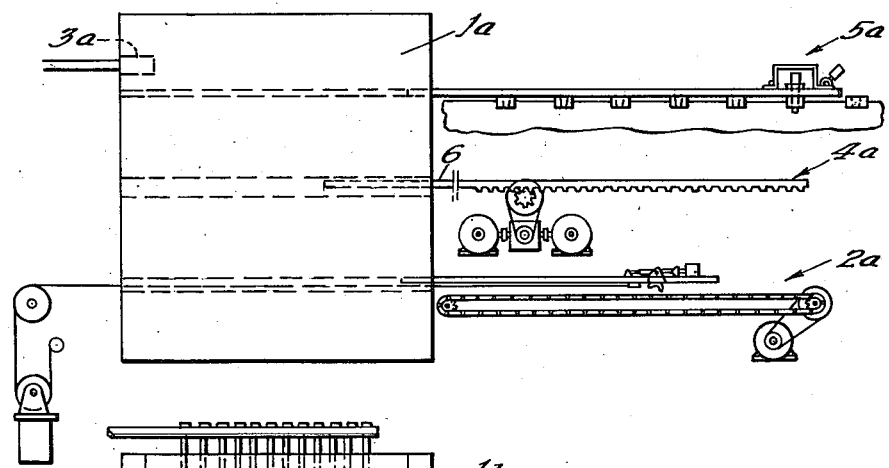
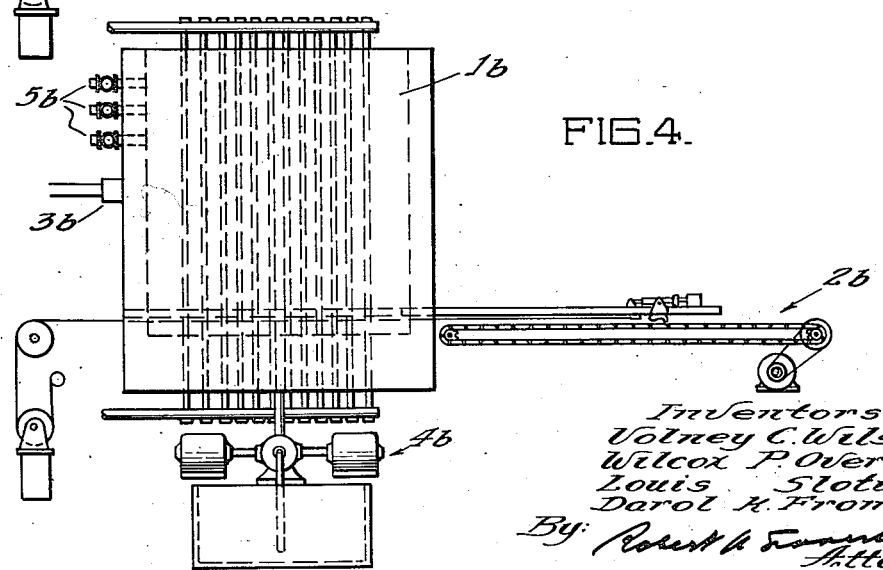
Inventors:
Volney C. Wilson
Wilcox P. Overbeck
Louis Slotin
Darol K. Froman
By: Robert A. ———
Attorney

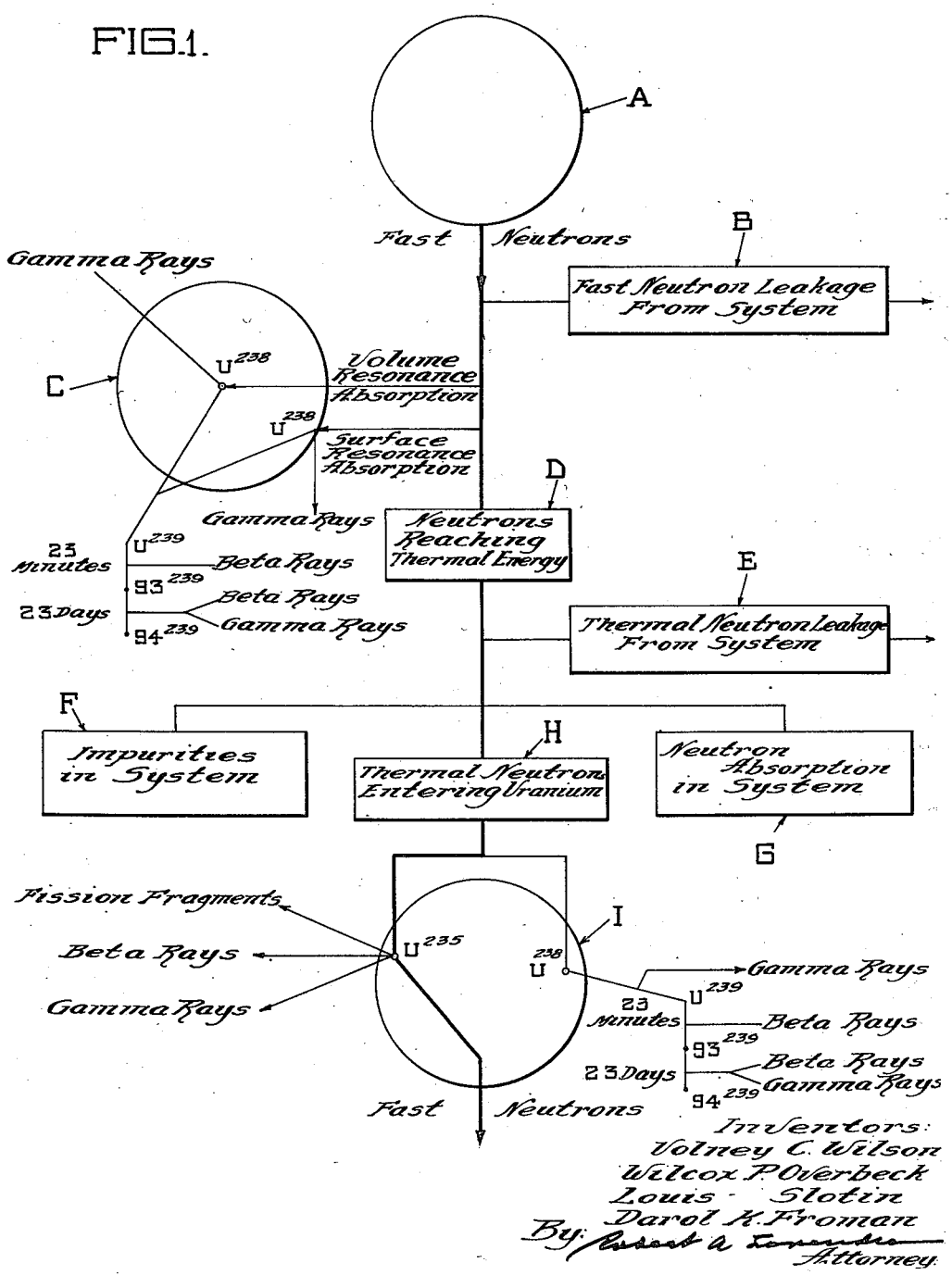

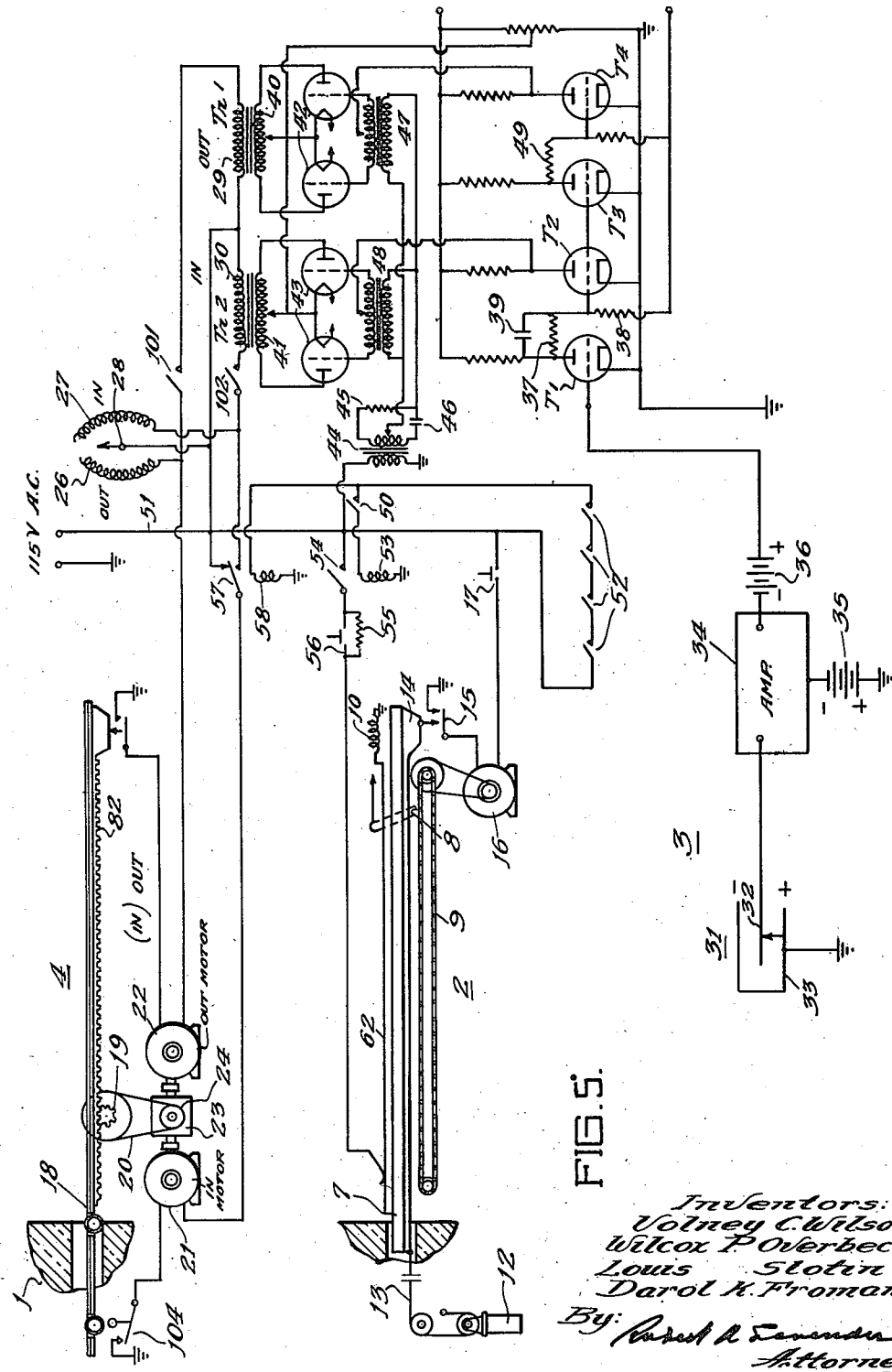

Dec. 17, 1957   V. C. WILSON ET AL   2,816,860
MEANS FOR CONTROLLING A NUCLEAR REACTOR
Filed April 14, 1945   8 Sheets-Sheet 4
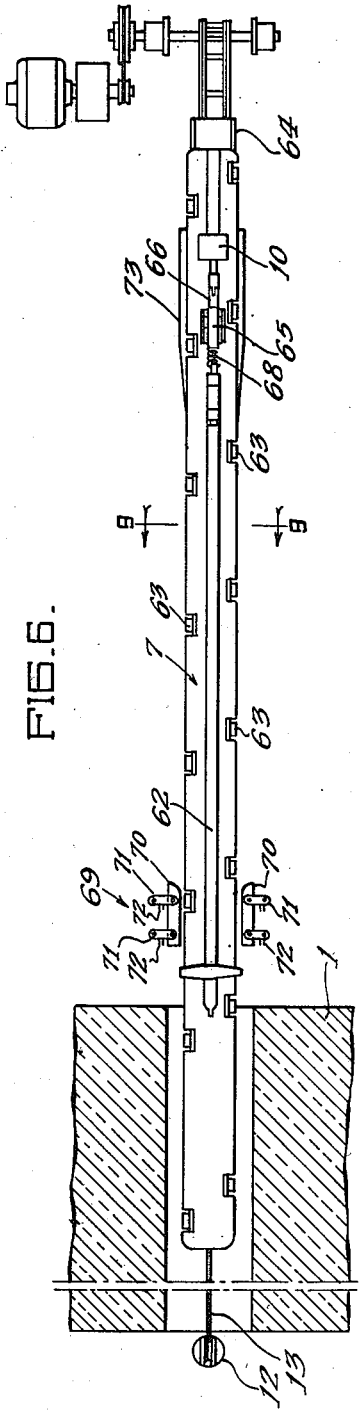
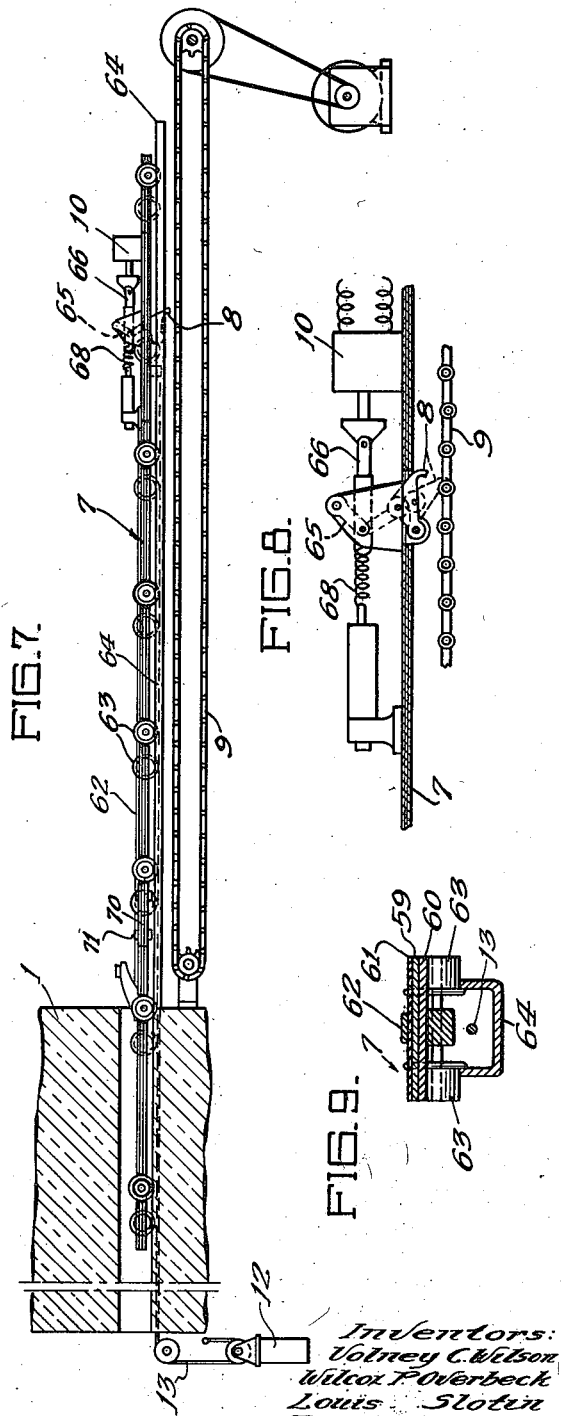
Inventors:
Volney C. Wilson
Wilcox P. Overbeck
Louis Slotin
Darol K. Froman
By:
Robert A. [signature]
Attorney

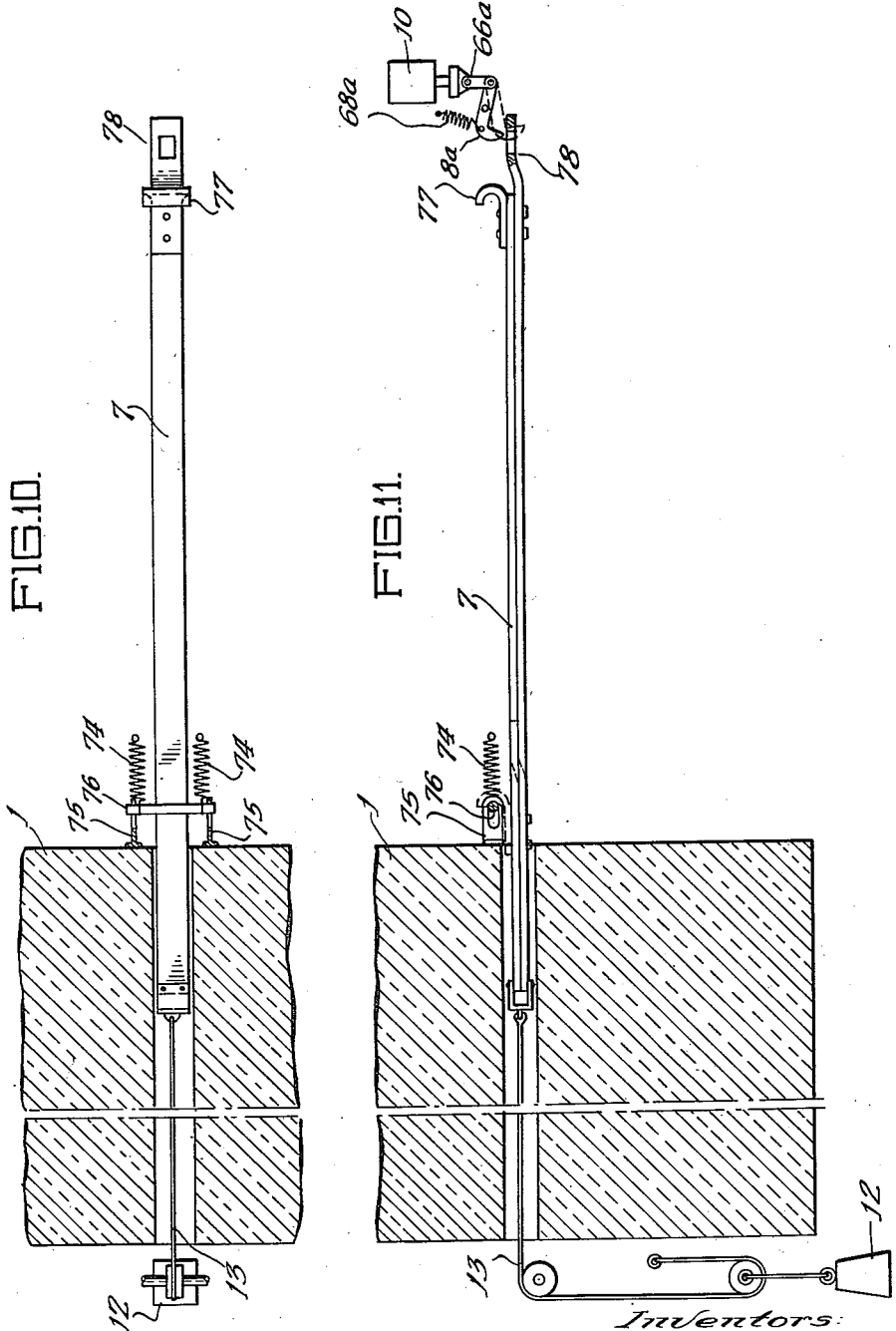

Dec. 17, 1957 V. C. WILSON ET AL 2,816,860
MEANS FOR CONTROLLING A NUCLEAR REACTOR
Filed April 14, 1945 8 Sheets-Sheet 6
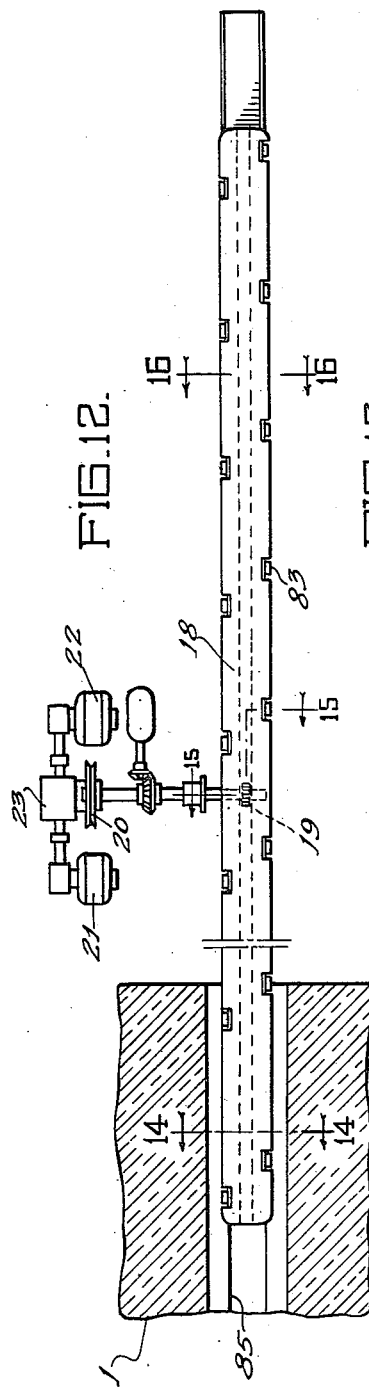
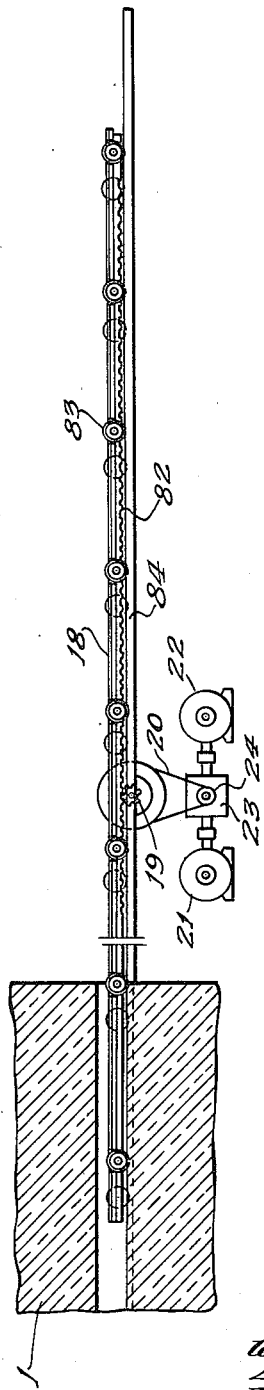
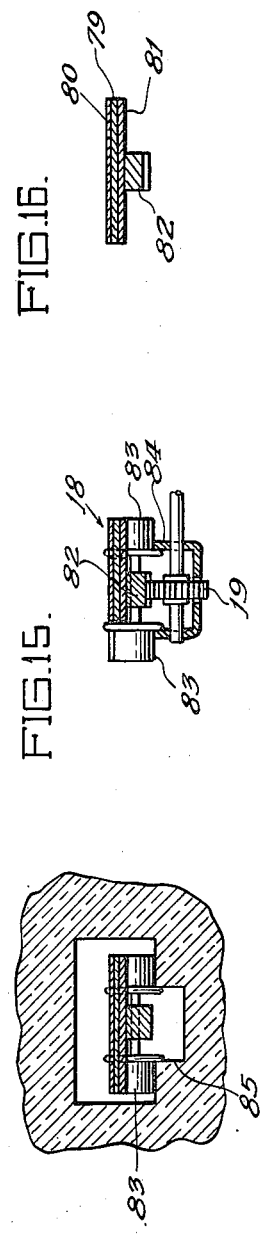
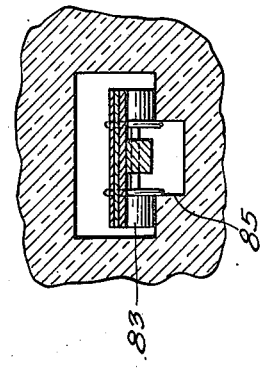
Inventors:
Volney C. Wilson
Wilcox P. Overbeck
Louis Slotin
Darol K. Froman
By: Robert A. [signature]
Attorney

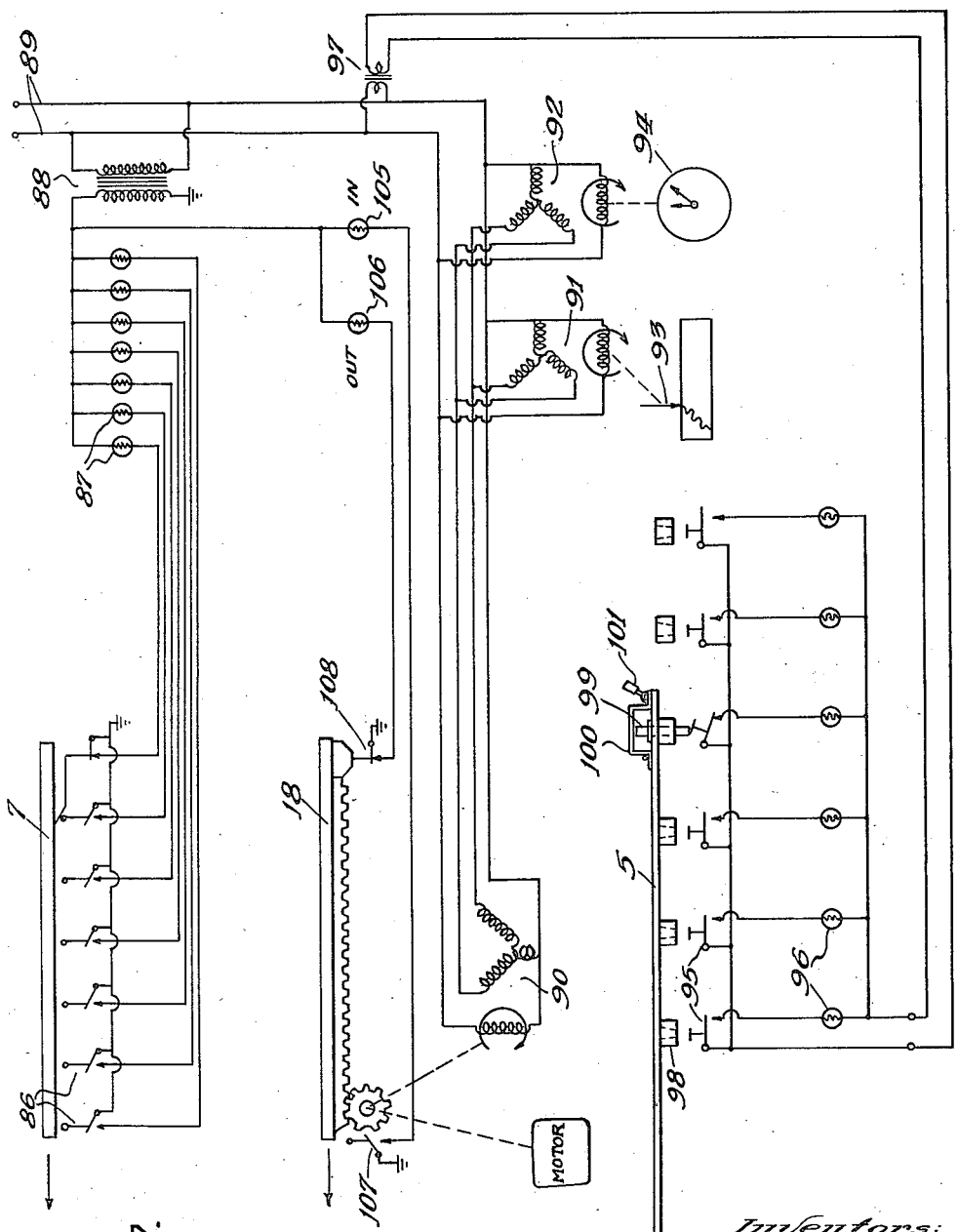

Dec. 17, 1957  V. C. WILSON ET AL  2,816,860
MEANS FOR CONTROLLING A NUCLEAR REACTOR
Filed April 14, 1945  8 Sheets-Sheet 8

Inventors:
Volney C. Wilson
Wilcox P. Overbeck
Louis Slotin
Darol K. Froman
By: Robert A. [signature]
Attorney.

United States Patent Office 2,816,860
Patented Dec. 17, 1957

2,816,860

MEANS FOR CONTROLLING A NUCLEAR REACTOR

Volney C. Wilson, Santa Fe, N. Mex., Wilcox P. Overbeck, Richland, Wash., Louis Slotin, Santa Fe, N. Mex., and Darol K. Froman, Denver, Colo., assignors to the United States of America as represented by the United States Atomic Energy Commission Application April 14, 1945, Serial No. 588,302

11 Claims. (Cl. 204—193.2)

Our invention relates to the general subject of neutronics, and more particularly to a means and method of creating and controlling a self-sustaining chain reaction produced by nuclear fission of uranium disposed in a neutron slowing medium or moderator. More specifically, our invention relates to methods and systems for control of self-sustaining nuclear fission chain reacting systems.

Certain isotopes, such as $U^{233}$ and $U^{235}$ in natural uranium, $94^{239}$ or other isotopes of element 94, can be split or fissioned by bombardment with thermal neutrons, i. e. neutrons in thermal equilibrium with the surrounding medium. Due to this phenomenon, a self-sustaining chain reacting system operating at high neutron densities can be built. In such a system, the fission neutrons produced give rise to new fission neutrons in sufficiently large numbers to overcome the neutron losses in the system. Since the result of the fission of the uranium or similar nucleus is the production of lighter elements with great kinetic energy, plus approximately 2 neutrons for each fission, along with beta and gamma radiation, a large amount of power in the form of heat can be made available. A self-sustaining chain reacting system has been described in U. S. Patent 2,708,656 issued to E. Fermi et al. on May 17, 1955.

Most of the neutrons arising from the fission process are set free with a very high energy of above one million electron volts average and are therefore not in condition to be utilized most efficiently to create new fissions in the $U^{235}$, when it is mixed with a considerable quantity of $U^{238}$, particularly as in the case of natural uranium. The energies of the fission-released fast neutrons are so high that most of the latter would tend to be absorbed by the $U^{238}$ nuclei, and yet the energies are not generally high enough for production of fission by more than a small fraction of the fast neutrons absorbed. For neutrons of thermal energies, however, the absorption cross-section of $U^{235}$, to produce fission, rises a great deal more than the simple capture cross-section of $U^{238}$; so that under the stated circumstances the fast fission neutrons, after they are created, are slowed down to thermal energy, the energy at which they are most effective to produce fresh fission by bombardment of additional $U^{235}$ atoms. If a system is made in which neutrons are slowed down without much absorption until they reach thermal energies and then mostly enter into uranium rather than into any other element, a self-sustaining nuclear chain reaction is obtained, even with natural uranium. Light elements, such as deuterium in the form of heavy water, beryllium, oxygen, or carbon, the latter in the form of graphite, can be used as slowing agents or moderators.

A special advantage of the use of the light elements mentioned for slowing down fast fission neutrons is that fewer collisions are required for slowing than is the case with heavier elements, and furthermore, the above enumerated elements have very small capture probabilities even for thermal neutrons. Carbon in the form of graphite is a relatively inexpensive, practical, and readily available agent for slowing fast neutrons to thermal energies. Recently beryllium has become available in sufficiently large quantities for test as to suitability for use as a neutron slowing material in a system of the type to be described. It has been found to be in every way satisfactory.

However, in order for the promise to be fulfilled that the fast fission neutrons be slowed to thermal energy in a slowing medium without too large an absorption in the uranium, every possible precaution is taken to conserve neutrons for the chain reaction.

The ratio of the number of fast neutrons produced in each generation by the fissions to the original number of fast neutrons creating the fissions in a system of infinite size, using specific materials, is called the multiplication constant of the system and is denoted by the symbol K. If K can be made sufficiently greater than unity to create a net gain in neutrons, and the system made sufficiently large so that this gain is not entirely lost by leakage from the exterior surface of the system, then a self-sustaining chain reacting system will produce power by nuclear fission of natural uranium. The neutron reproduction ratio $r$ in a system of finite size differs from K by the exterior leakage factor and by a factor representing a loss due to localized absorbers within the reactor at any one time. The reproduction ratio must be sufficiently greater than unity to permit the neutron density to rise exponentially within the system. Such rise will tend to continue indefinitely if not controlled at a desired density corresponding to a desired power output.

It is therefore important to construct a system comprising uranium and a slowing medium so that neutron losses are reduced to such an extent that a controllable self-sustaining neutron chain fission reaction is obtained therein, with resultant regulated production of neutrons, liberation of power in the form of heat and production of radioactive fission products and new elements both radioactive and stable produced by the absorption of neutrons.

It is an object of our invention to provide a control system responsive to the neutron density in a portion of a self-sustaining neutron chain reacting system for automatically maintaining the total power output at a substantially constant predetermined value.

Since changes in neutron density can, under certain conditions, occur with great rapidity, it is intended to provide a control system responsive not only to the prevailing neutron density, but also responsive to the rate of change of neutron density. More particularly, the time lag inherent in the operation of the control mechanism would ordinarily be such that the neutron density might suddenly rise to abnormally high values before control could be effected. It is therefore an object of our invention to provide rate-responsive means for causing the control mechanism to overrun with the onset of a relatively sudden change so as to cause a compensating control function before the change has fully taken place.

Another object of our invention is to change the reproduction ratio of a chain reacting system to permit an increase and decrease of power output.

A further object of our invention is to provide safety means, in the aforesaid control system responsive to neutron density, for keeping the power output below a predetermined maximum value at all times.

During the interchange of neutrons in a system comprising bodies of uranium of any size in a slowing medium, neutrons are lost in four ways without producing fission: by absorption in the uranium metal or compound; by absorption in the slowing down material; by absorption in impurities present in the system; and by leakage out of the system. These losses will be considered in the order mentioned.

Natural uranium, particularly by reason of its $U^{238}$ content, has an especially strong absorbing power for neutrons when they have been slowed down to so called resonance energies. The absorption in uranium at these energies is termed the uranium resonance absorption or capture. It is caused by the isotope $U^{238}$ and does not result in fission but leads to the creation of the relatively stable nucleus $94^{239}$. It is not to be confused with absorption or capture of neutrons by impurities, referred to later. Neutron resonance absorption in uranium may take place either on the surface of the uranium bodies, in which case the absorption is known as surface resonance absorption, or it may take place in the interior of the uranium body, in which case the absorption is known as volume resonance absorption. It will be appreciated that this classification of resonance absorptions is merely a convenient characterization of observed phenomena, and arises, not because the neutron absorbing power of a $U^{238}$ nucleus is any greater when the nucleus is at the surface of a body of metallic, or combined uranium, but because the absorbing power of $U^{238}$ nuclei for neutrons of certain particular energies is inherently so high that practically all neutrons that already happen to have those energies, called resonance energies, are absorbed almost immediately upon their arrival in the body of uranium metal or uranium compound, and thus in effect are absorbed at the surface of such body. Volume resonance absorption is due to the fact that some neutrons make collisions inside the uranium body and may thus arrive at resonance energies therein, to be absorbed directly and immediately by $U^{238}$. After successfully reaching thermal velocities, neutrons are also subject to capture by $U^{238}$ without fission. Such capture by $U^{238}$ produces $92^{239}$ leading to the production of $94^{239}$ by beta decay.

Thermal neutrons are also subject to capture by the moderator. While carbon and beryllium have very small capture cross-sections for thermal neutrons, and deuterium extremely small, a fraction of thermal neutrons is lost by capture in the slowing material during diffusion therethrough. It is therefore desirable to have the neutrons reaching thermal energy promptly enter uranium.

In addition to the above mentioned losses, which are inherently a part of the nuclear chain reaction process, impurities present in both the slowing material and the uranium add a very important parasitic neutron loss factor in the chain. The effectiveness of various elements as neutron absorbers varies tremendously. Certain elements, such as boron, cadmium, samarium, gadolinium, and some others, if present even in a few parts per million, could very likely prevent a self-sustaining chain reaction from taking place. It is highly important, therefore, to remove as far as possible all impurities capturing neutrons to the detriment of the chain reaction from both the moderator and the uranium. If these impurities, solid, liquid or gaseous, and in elemental or combined form, are present in too great quantity in the uranium bodies or the slowing material or in, or by absorption from the free spaces of the system, the self-sustaining chain reaction cannot be attained.

The amounts of impurities that may be permitted in a system vary with a number of factors, such as the specific geometry of the system and the form in which the uranium is used—that is, whether natural or enriched with fissionable isotopes, whether as metal or oxide—and also factors such as the weight ratios between the uranium and the slowing down material, and the type of slowing down or moderating material used—for example, whether deuterium, graphite or beryllium. Although all of these considerations influence the actual permissible amount of each impurity material, in general the effect of any given impurity or impurities can be correlated directly with the weight of the impurity present and with the K factor of the system, so that knowing the K factor for a given geometry and composition, the permissible amounts of particular impurities can be readily computed without taking individual account of the specific considerations named above. Different impurities are found to affect the operation to widely different extents; for example, relatively considerable quantities of elements such as hydrogen may be present, and the uranium may be in the form of oxide, such as $UO_2$ or $U_3O_8$, or the carbide, although the metal is preferred. Nitrogen may be present to some extent and its effect on the chain reaction is such that the neutron reproduction ratio of the system may be changed by changes in atmospheric pressure. This effect may be eliminated by enclosing or evacuating the system if desired.

When the uranium and the moderator are of such purity, and the uranium and the moderator are so combined that fewer neutrons are parasitically absorbed than are gained by fission, the uranium will support a chain reaction, producing an exponential rise in neutron density, if the overall size of the system is sufficiently large to prevent excessive loss of neutrons from the exterior of the system. Thus the overall size is important.

The overall size of the system will vary, depending upon the K constant of the system and upon other things including the type of moderator used. If the multiplication constant K is greater than unity, the number of neutrons present will increase exponentially and indefinitely, provided the structure is made sufficiently large. If, on the contrary, the structure is small, with a large surface-to-volume ratio, there will be a rate of lose of neutrons from the structure by leakage through the outer surfaces, which may overbalance the rate of neutron production inside the structure so that a chain reaction will not be self-maintaining. For each value of the multiplication constant K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction capable of self-maintenance. The rate of diffusion of neutrons away from a large structure, in which they are being created, through the exterior surface thereof may be treated by mathematical analysis when the value of K and certain other constants are known, as the ratio of the exterior surface to the volume becomes less as the structure is enlarged.

Having thus generally defined the losses encountered in a self-sustaining chain reacting system operating by virtue of nuclear fission by thermal neutrons, it is a further object of our invention to provide a means and method of correlating the neutron losses in a system of practical size comprising uranium and an efficient moderator to obtain a self-sustaining chain reaction capable of producing power, with full control over the power output of the system.

Chain reacting systems operating by virtue of nuclear fission may be classed in various categories, in accordance with the form and shape of the uranium bodies and the type of moderator utilized.

For example, when either beryllium or carbon in the form of graphite is used as a moderator, surface resonance losses are reduced to a point where K factors up to at least 1.09 can be obtained by aggregating the uranium into spheres, cylinders, rods or approximate shapes, geometrically disposed in at least one plane in the moderator. The optimum K constant is obtained for uranium metal spheres, decreasing as the surface-volume ratio of the uranium bodies is increased due to increase of surface resonance absorption. Likewise the optimum K constant is decreased by the use of uranium in effectively less dense form than the metal, such as the carbide, or the oxides $UO_2$ and $U_3O_8$. For every K constant above unity the overall critical size of the structure is such that a neutron chain reaction can be obtained. The following specific examples will indicate the approximate characteristics of graphite-uranium systems using materials of presently available purity.

| System type | U sphere (rod) radius, cm. | Volume ratio, carbon to uranium | K | Critical size sphere, diameter, ft. |
|---|---|---|---|---|
| Spheres of uranium metal in graphite | 2 | 60:1 | 1.07 | 21 |
| Spheres of $UO_2$ in 30 graphite | 4 | 23:1 | 1.03 | 31 |
| Rods of U in graphite | 2 | 55:1 | 1.05 | 24 |

When $D_2O$ (heavy water or deuterium oxide) is used as a moderator, the system, due to the efficiency of the $D_2O$ as a moderator, is capable of operation as a chain reacting system even when the uranium is in the form of fine particles or powder such as $UO_2$ dispersed as a slurry in $D_2O$, where the particles are of from a fraction of a micron to about 50 microns in diameter. When a U to $D_2$ ratio of .0025 to 0.040 is used and the slurry is placed in, for example, a spherical tank 13.4 ft. to 56.5 ft. in radius, the chain reaction will be maintained.

The use of the slurry will greatly increase the surface resonance absorption, but as the reaction when $D_2O$ is used will take place in spite of the increased absorption, it follows that K factors up to 1.3 can be obtained by reducing the resonance absorption by using the uranium in the form of bodies of substantial size dispersed in $D_2O$. The high K factors and the favorable characteristics of the deuterium permit the overall size of such systems to be much smaller than when graphite or beryllium are used as moderators. For example, the minimum amount of heavy water required for sustaining a chain reaction for optimum uranium rod geometry is about 4 tons of heavy water with 2.1 tons of uranium rods dispersed therein. A self sustaining reaction may be provided with 136 uranium metal rods 4.1 ft. in length and 1.1 inches in diameter spaced 5.5 inches center to center and having an aluminum sheath .035 inches thick when a tank filled with heavy water enclosing the rods is used, the tank being surrounded by a layer of graphite approximately two feet in thickness to serve as a neutron reflector.

The fact that neutron absorption losses in excess of inherent losses may be introduced in these chain reacting systems leads to effective control of the chain reaction. By building the system to have the ability to develop a chain reaction, losses may be deliberately increased to maintain the chain reaction in balance at a predetermined neutron density, and consequently at a predetermined power output in the form of heat.

In the systems having solid moderators, it is convenient to control the reaction by introducing neutron absorbing impurities into the system. When a liquid moderator such as $D_2O$ is utilized, the reaction can be controlled by introducing impurities into the system or by otherwise varying the critical size, or by varying the effective size (as by varying the amount of moderator in the tank), or by combining various methods.

The effect of impurities on the multiplication constant K of any system may be conveniently evaluated to a reasonable approximation, simply by means of certain constants known as "danger coefficients" which are assigned to the various elements. These danger coefficients for the impurities are each multiplied by the percent by weight of the corresponding impurity, and the total sum of these products gives a value known as the total danger sum. This total danger sum is subtracted from the multiplication constant K as calculated for pure materials and for the specific geometry under consideration.

The danger coefficients are defined in terms of the ratio of the weight of impurity per unit mass of uranium and are based on the cross-section for absorption of thermal neutrons of the various elements. These values may be obtained from physics textbooks on the subject and the danger coefficient computed by the formula $$\frac{\sigma_i \cdot A_u}{\sigma_u \cdot A_i}$$

wherein $\sigma_i$ represents the cross-section for the impurity and $\sigma_u$ the cross-section for the uranium, $A_i$ the atomic weight of the impurity and $A_u$ the atomic weight of uranium. If the impurities are in the carbon, they are computed as their percent of the weight of the uranium of the system.

Danger coefficients for some elements are given in the following table, wherein the elements are assumed to have their natural isotopic constitution unless otherwise indicated and are conveniently listed according to their chemical symbols:

| Element | Danger coefficient | Element | Danger coefficient |
|---|---|---|---|
| $H^1$ | 10 | Mo | 1.0 |
| $D^2$ | 0.01 | Ru | ~2 |
| He | 0 | Rh | 50 |
| Li | 310 | Pd | ~2 |
| Be | 0.04 | Ag | 18 |
| B | 2150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | <3 | I | 1.6 |
| Na | 0.65 | Xe | <6 |
| Mg | 0.48 | Cs | 8.7 |
| $A^1$ | 0.30 | Ba | 0.30 |
| Si | 0.26 | La | <2.4 |
| P | 0.3 | Ce | <2.4 |
| S | 0.46 | Pr | <2.4 |
| Cl | 31 | Nd | ~17 |
| A | ~0.8 | Sm | ~1430 |
| K | 2.1 | Eu | 435 |
| Ca | 0.37 | Gd | ~6320 |
| Sc | <7 | Tb | ~20 |
| Ti | 3.8 | Dy | ~200 |
| V | 4 | Ho | ~10 |
| Cr | 2 | Er | ~40 |
| Mn | 7.5 | Tm | ~20 |
| Fe | 1.5 | Yb | 10 |
| Co | 17 | Lu | 30 |
| Ni | 3 | Hf | 20 |
| Cu | 1.8 | Ta | 4.6 |
| Zn | 0.61 | W | 2.7 |
| Ga | ~1 | Re | ~18 |
| Ge | (<5) | Os | 1.7 |
| As | 2 | Ir | ~70 |
| Se | 6.3 | Pt | ~2.5 |
| Br | 2.5 | Au | 16 |
| Kr | <6 | Hg | 82 |
| Rb | ~0.4 | Tl | 0.5 |
| Sr | 0.57 | Pb | 0.03 |
| Y | 0.4 | Bi | 0.0025 |
| Zr | ~0.13 | Th | 1.1 |
| Cb | <0.4 | | |

Of course, where an element is necessarily used in an active part of a system, it is still to be considered as an impurity; for example, in a structure where the uranium bodies consist of uranium oxide, the actual K constant would ordinarily be computed by taking that fact into account, using as a base K a value computed for theoretically pure uranium.

As a specific example, if the materials of the system under consideration have .0001 part by weight of H, Co, and Ag, the total danger sum in K units for such an analysis would be:

.0001×10+.0001×17+.0001×18=.0045K units

This would be a rather unimportant reduction in the reproduction constant K unless the reproduction constant for a given system, without considering impurities, is very nearly unity. If, on the other hand, the impurities in the uranium in the previous example had been Li, Co, and Rh, the total danger sum would be:

.0310+.0017+.0050=.377K units

This latter reduction in the reproduction constant for a given system might be serious and might well reduce the reproduction constant below unity for certain geometries so as to make it impossible to effect a self-maintaining chain reaction with natural uranium and graphite, but might still be permissible when using uranium in a $D_2O$ system having a high K constant.

This strong absorbing action of some elements renders a self-sustaining chain reacting system capable of control. By introducing neutron absorbing elements in the form of rods or sheets into the interior of the system, for instance in the moderator between the uranium masses, the neutron reproduction ratio of the system can be changed in accordance with the amount of absorbing material exposed to the neutrons in the system. A sufficient mass of the absorbing material can readily be inserted into the system to reduce the reproduction ratio of the system to less than unity and thus stop the reaction.

Where $D_2O$ or other liquid is used as a moderator, the reproduction ratio can be effectively changed by changing the volume of the system, that is, by pumping out and pumping in $D_2O$ to vary the volume of immersed uranium from below to various values above, critical size. The greater the volume above critical size, the greater will be the reproduction ratio. As the volume is increased, the neutron leakage losses through the outer surfaces decrease.

A still further object of our invention is to control a self-sustaining chain reacting system by varying the losses in the system.

The foregoing constitute some of the principal objects and advantages of the present invention, others of which will become apparent from the following description read in conjunction with the drawings, in which:

Fig. 1 is a diagrammatic representation of the neutron utilization in a self-sustaining chain reaction process;

Fig. 2 is a diagrammatic showing of the various control features (exclusive of circuits) applied to a self-sustaining chain reacting system comprising uranium lumps interspersed in a graphite moderator;

Fig. 3 is a modification of Fig. 2 showing a removable stringer, instead of a regulating rod for system control;

Fig. 4 is another modification of Fig. 2 wherein the chain reacting system comprises uranium rods immersed in a deuterium oxide (heavy water) neutron slowing medium;

Fig. 5 is a schematic diagrammatic showing of the control system, exclusive of the indicating system, for performing the control features illustrated in Figs. 2, 3, and 4;

Fig. 6 is a plan view of the safety rod operating mechanism;

Fig. 7 is a view in side elevation of the structure shown in Fig. 6;

Fig. 8 is an enlarged side view, partly in section, of an electromagnetically operated catch associated with the safety rod in Fig. 6;

Fig. 9 is an enlarged sectional view taken along line 9—9 of Fig. 6;

Fig. 10 is an enlarged plan view of a modified form of safety rod operating mechanism illustrated in Fig. 5;

Fig. 11 is a side view of the structure shown in Fig. 10;

Fig. 12 is a plan view of the regulating or control rod operating mechanism illustrated in Fig. 5;

Fig. 13 is a side view of the mechanism illustrated in Fig. 12;

Fig. 14 is an enlarged sectional view taken along line 14—14 of Fig. 12;

Fig. 15 is an enlarged sectional view taken along line 15—15 of Fig. 12;

Fig. 16 is an enlarged sectional view taken along line 16—16 of Fig. 12;

Fig. 17 is a schematic showing of the indicating system embodied in the control system shown in Fig. 5;

Figure 18:
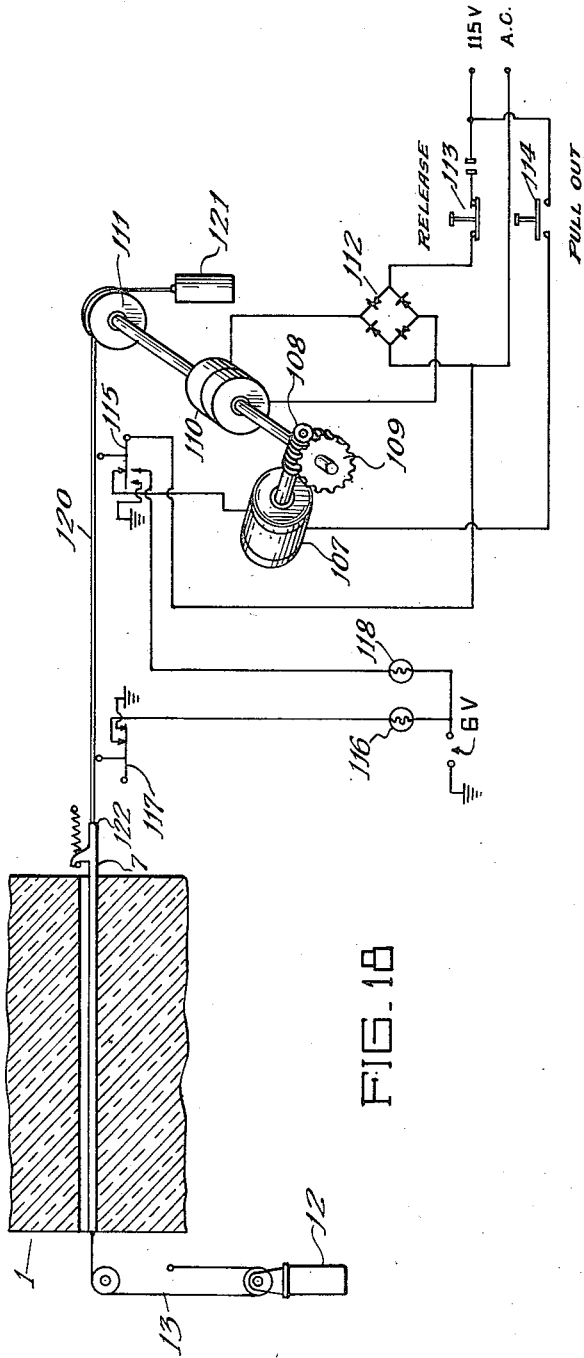
Fig. 18 is a schematic showing of a modification of the safety rod operating mechanism shown in Figs. 6 to 9, inclusive.

To illustrate the importance of the various factors entering into a chain reaction, an example of a chain reaction process will be described, as it is presently understood to occur in any system of finite size utilizing, for example, natural uranium dispersed in graphite, deuterium, or other neutron moderator.

Referring to Fig. 1:

A represents a uranium body of any size from which fast neutrons are set free as a result of the fission process.

B represents a fast neutron loss due to leakage from the system.

C represents a uranium body of any size in which both volume and surface resonance absorption of neutrons by $U^{238}$ takes place at resonance energies above thermal energy to form $94^{239}$.

D represents the number of neutrons reaching thermal energy.

E represents a thermal neutron loss by diffusion of thermal neutrons from the system.

F represents a neutron loss caused by capture of neutrons by impurities in both uranium and neutron slowing material as well as neutron loss caused by insertion of neutron absorbing material into the system.

G represents a neutron loss due to capture of thermal neutrons by the neutron moderator as the thermal neutrons diffuse therethrough before entering uranium.

H represents the number of thermal neutrons entering a uranium body.

I represents a uranium body of any size in which part of the thermal neutrons entering the body are absorbed by $U^{238}$ to form $94^{239}$, the remaining thermal neutrons causing new fissions, thereby producing new fast neutrons.

The four neutron losses from the chain reaction referred to above are represented in Fig. 1 where the resonance absorption at C and the fraction of thermal neutrons absorbed by $U^{238}$ at I represent the uranium absorption losses. Losses due to impurities are represented at F, those due to absorption in the moderator at G, and the leakage losses due to the finite size of the system, at B and E.

For purposes of control, the losses due to impurities, by insertion into the system of materials which absorb a substantial amount of neutrons such as cadmium, boron, etc., are of outstanding importance, since such losses more readily lend themselves to variation.

By using neutron absorbing control rods, the system may be controlled automatically as well as manually. Since the power produced by a chain reacting system is proportional to the rate of generation of neutrons in the system, it will be readily apparent that the control may be made responsive to the neutron density in a representative portion of the system, such as a portion within and adjacent the outer walls—or even exterior of the outer walls. From a knowledge of the neutron density distribution within the system (generally a cosine curve distribution with maximum density at the center) the neutron density in any part of the system is readily determined. A convenient device for measuring or detecting such neutron density is an ionization chamber having electrodes including a collecting electrode inserted in a medium which can be ionized as a result of neutron bombardment, such as $BF_3$, argon, Freon, or the like. Such ionization chambers are well known in the art and, per se, form no part of the present invention.

It is generally desired to maintain the neutron density of the system at a substantially constant predetermined value, although while starting the system from a point where the reproduction ratio is appreciably below unity when all the neutron absorbing rods are inserted therein, it may be desirable to bring the system to a reproduction ratio of above unity in steps taking minutes, or perhaps hours or days. The operation of the control system will be better understood by the following description of types of control used and the various operations which take place as the neutron absorbing rods are inserted into and withdrawn from the system.

Referring more particularly to Fig. 2, numeral 1 denotes a block diagram that represents a self-sustaining neutron chain reacting system such as, for example, one having a plurality of lumps of uranium containing material (or uranium) interspersed geometrically in the form of a lattice structure in a neutron slowing medium such as graphite, preferably in the form of a plurality of closely stacked blocks. For this reason system 1 is also referred to as a pile. Numeral 2 denotes, generally, a safety mechanism comprising a safety rod incorporating a material which can absorb a substantial number of neutrons, such as boron, cadmium, gadolinium, samarium, etc. The safety rod is normally held in a withdrawn or retrieved position from system 1 by means of a catch held engaged in a perforated portion of the safety rod by an electromagnet when energized. When the electromagnet is de-energized for any reason, such as an abnormal increase in the neutron density of the system as determined by a neutron density responsive device 3, such as an ion chamber or proportional counter, a spring withdraws the hook from the rod and allows a weight operating through a pulley system to pull the safety rod into the system so as to bring the neutron reproduction ratio below unity and stop the self-sustaining chain reaction. The purpose of the safety mechanism is to provide an emergency means for stopping the reaction in the system if some abnormal condition should arise, such as an excessive rise in neutron density. The mechanism will be described in detail hereinafter with reference to Fig. 5.

Numeral 4 denotes a regulating or control mechanism such as a pair of mechanically coupled motors, one for driving a regulating rod of neutron absorbing material into the system and the other for driving it out of the system in response to an increase or decrease of neutron density, respectively, as indicated by the neutron density responsive device 3, so as to maintain the neutron density at a substantially constant value as will be described in detail hereinafter, in connection with Fig. 5.

Numeral 5 denotes a limiting mechanism comprising a limiting rod, or a plurality of rods, of neutron absorbing material which can be projected into the system any desirable amount and locked in place by a tapered pin and a padlock or equivalent locking device if so desired. The purpose of the limiting rod is to limit the neutron reproduction ratio of the system to a predetermined maximum value. It may also be used to compensate for a change in the reproduction ratio of the system caused by a change in temperature, a change in the amount of impurities in the system resulting from operation and to compensate for an increase in the reproduction ratio caused by enrichment of the uranium through the production of the fissionable nucleus 94 as the result of continued operation of the system. It is also used to compensate for the difference in reproduction ratio caused by increase in temperature when the system is started from a cold condition and is brought up to a warm or hot operating condition. The rate of neutron rise within the reactor is determined by the value by which the reproduction ratio exceeds unity and for a reproduction ratio less than 1.01 the rate of rise is limited by the time of release of the neutrons upon fission of the nucleus $92^{235}$. Since some of the neutrons, approximately 1 percent of the fission neutrons, are delayed in their emersion it is generally desirable to keep the maximum attainable reproduction ratio below 1.01, that is, within the range of the delayed neutron effect as explained more fully hereinafter.

Fig. 3 shows a modification of the device shown in Fig. 2 and has identical parts which are indicated by suffixing the letter $a$ to the reference numerals used in Fig. 2. Fig. 3 differs from Fig. 2 only in the regulating mechanism 4a, which comprises a stringer 6, such stringer 6 being in reality, an elemental portion of system 1a, that is, a portion having the same dimensional structure of uranium containing material in a graphite medium as the rest of 1a instead of being merely a rod of neutron absorbing material as shown in Fig. 2. The purpose of the regulating mechanism 4a is the same as that of 4 in Fig. 1, namely, to change the reproduction ratio in the system by changing the space relationship of one portion of the system to the remainder. For example, the stringer 6 may comprise a section of the reactor that is movable into and out of the active portion of the system, the reproduction ratio increasing as the stringer is inserted therein, and decreasing upon removal. The stringer may preferably comprise uranium lumps distributed in an elongated section of graphite extending in a direction aligned with the mechanism 4a, the uranium being the same spatial relationship as in the remaining section of the active portion of the reactor.

Fig. 4 shows a further modification of the device shown in Fig. 2 and the various mechanisms having the same purpose are denoted by the same reference numerals except that a suffix $b$ is added; for example, system 1b of Fig. 4 corresponds to system 1 of Fig. 2, etc. Instead of using uranium containing material in a graphite medium, as shown in Fig. 2, the system 1b comprises a plurality of parallel rods of uranium containing material immersed in a neutron slowing material of deuterium oxide. The safety mechanism 2b and the limiting mechanism 5b are substantially identical to 2 and 5, respectively, in Fig. 2. The regulating mechanism 4b differs from 4 in Fig. 2 in that the two motors used to drive in opposite directions have the function of driving a reversible pump in opposite directions to pump more heavy water either into the system or out of the system so as to increase the volume above critical size or to bring it below critical size, depending on whether the neutron density indicated by indicator 3b is below or above a predetermined desired value. The ultimate purpose of mechanism 4b in Fig. 4 is the same as that of 4 in Fig. 2, namely, to alter the neutron reproduction ratio. Instead of using the mechanism 4b to vary the reproduction ratio by variation of the heavy water level, the control rod structure 4 of Fig. 2 may be used. Thus the level of heavy water may be initially adjusted with the control rod inserted to a height such that the reproduction ratio is greater than unity upon partial removal of the control rod. However, in a liquid moderated system the features shown in Fig. 4 utilized for controlling the maximum reproduction ratio may comprise the limiting mechanism 5b which includes a plurality of overflow ports or valves, any one of which may be selectively opened to maintain the level of the heavy water at a predetremined maximum value, thereby having the same general purpose as the limiting mechanism 5 of Fig. 2, namely, that of limiting the neutron reproduction ratio to a predetermined maximum permissible value and of affording adjustment of such maximum value.

While lumping of the uranium is indispensable in systems using graphite as a slowing medium or moderator such as described in Figs. 2 and 3, it is not very important in the structure shown in Fig. 4 using heavy water since the absorption losses therein are almost negligible. A modification of the structure shown in Fig. 4, wherein our control system is equally applicable, is a "slurry" system having finely divided fissionable material such as particles of $UO_2$ suspended in heavy water pumped through tubes and surrounded by a heavy water slowing material (i. e. moderator). In fact, the active portion may comprise a tank containing a mass of such slurry externally circulated for purposes of cooling and our invention is applicable to any chain reacting system and is not limited to those described.

A general description of certain control characteristics and method of controlling the reactor will now be given and will be described more in detail later with reference to the operation of the control system illustrated in Fig. 5.

After the neutron absorbing rods are withdrawn from system 1 and, in order to stabilize the reaction at any desired neutron density within the system, the neutron density is measured as it is rising. When a predetermined neutron density is reached within the system, the cadmium or other neutron absorbing material is reinserted into the system to a point where sufficient neutrons are absorbed to prevent an increase in the neutron production, the absorption being by reason of the impurities introduced into the system. The chain reaction will then be in balance at the new neutron density. To reduce the neutron density, still more absorbing material is introduced into the system, sufficient, for example, to increase the total impurity absorption to a point sufficient to absorb additional neutrons. Under these conditions less than the necessary amount of thermal neutrons for a self-sustaining chain reaction will be absorbed in the uranium and the neutron density will decay, because fewer neutrons will be produced than the number of original neutrons in each successive chain. The system can then be stabilized when the new desired lower density is reached by partially withdrawing the control rod, thereby decreasing the neutron absorbing material in the system until the number of neutrons developed are sufficient to maintain the new lower neutron density.

As indicated above, an important characteristic in the control of the pile is the fact that not all of the fast neutrons originating in the uranium leave the uranium immediately. About 1 percent of the fast neutrons are delayed neutrons. These delayed neutrons may appear at any time up to several minutes after the fission has occurred. Half of these neutrons are emitted within six seconds and .9 within 45 seconds. The mean time of delayed emission is about 5 seconds. The reproduction cycle is completed by 99 percent of the neutrons in about .0015 seconds, but if the system is near the balanced condition the extra 1 percent may make all the difference between an increase or a decrease in the activity. The fact that the last neutron in the cycle is held back, as it were, imparts a slowness of response to the pile that would not be present if the originating neutrons at A (Fig. 1) were all emitted instantaneously.

For cases wherein the reproduction ratio ($r$) is above unity by appreciably less than 1 percent, the rise of neutron density, or more specifically the value $n$ to which the number of neutrons has risen from an original value $n_0$, after a lapse of time of $t$ seconds during and before which the pile has operated at a fixed value of $r$ ($n_0$ being the number of neutrons at the beginning of $t$, i. e., after disappearance of transient effects due to any preceding change in $r$), is given by $$n = n_0 e^{wt}$$

where $$w = \frac{r-1}{\alpha-(r-1)} \cdot \frac{1}{T}$$

and $t$ is time. In this formula $\alpha$ is the fraction of the neutrons that are delayed, i. e., $\alpha = 0.0067$ and $T$ is the mean time of delayed emission of the delayed neutrons, or 5 seconds. The above formula is only approximate because it uses an average delay time.

Figure 19:
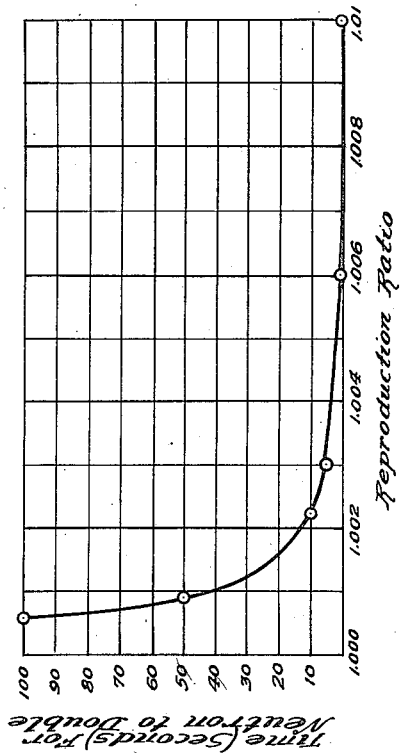
Fig. 19 is a chart showing time for neutrons to double versus reproduction ratio in a chain reacting system.

As an example, assume as a result of moving the control rod, $r$ becomes 1.001 and assume that the system has settled down to a steady exponential rise in neutron density. Then $$w = \frac{.001}{0.0067 - .001} \times \frac{1}{5} = \frac{1}{28.5}$$

that is, $n/n_0 = 2.72$ in 28.5 seconds. Thus doubling of the neutron density occurs about every 20 seconds. The above formula thus indicates the rate of rise for relatively low values of $r$ and shows how the reduction of the rate by the delayed neutron effect is particularly significant in the stated lower range of $r$ values. Strictly speaking, the given equation holds only for the steady state, i. e., where $r$ has been held constant for some time; an additional transient term must be included to obtain an accurate representation of the neutron density during the first few seconds after a sudden change of $r$. See Fig. 19, also.

If $r$ were made exactly 1.01, a more detailed theory shows that the neutron density would be tripled each second. However, if the reproduction ratio $r$ is several percent greater than unity, so that one percent delayed neutrons are unimportant compared with $r-1$, the density increases at a much more rapid rate as given approximately by $r^{t/l}$ where $l$ is .0015 seconds, the normal time for the neutrons to complete a reproduction cycle. Thus if $r$ were to be made 1.04 the neutron density would increase in 1.5 seconds by a factor of approximately $10^{17}$ over its original level. However, if $r$ were 1.02 or 1.03, the factors by which the neutron density would be multiplied each second would be 1100 and 700,000, respectively.

It is thus apparent that too high a reproduction ratio in a practical system leads to the necessity of inserting what may be considered as an excessive amount of controlling absorbers. An exceedingly dangerous condition could exist if by accident these absorbers were suddenly completely removed, as the time required for reinserting the absorbing material might be too long to prevent destruction of the system. As the same eventual density can be obtained with a reproduction ratio only slightly over unity, as with a higher ratio, only at slower rate, the lower reproduction ratios are preferred in practice in the interest of safety.

It should be pointed out here that neutron absorbers inserted into the pile cannot continue to absorb neutrons indefinitely. The continued absorption of neutrons by the absorbing material causes transmutation of the absorbing material, and an element or isotope may be built up within the controlling material which has a smaller neutron capture cross-section than the original material. This action will occur in piles operated at high neutron densities, and is corrected by systematic replacement of the absorbing material at predetermined intervals. In this respect, it is to be noted that the safety rods provided are not normally fully inserted in the pile until the pile is shut down, and therefore are not subjected to prolonged operation at high neutron densities. Thus, they retain their effectiveness for emergency operation.

After the structure has been completed, it is ready for operation, utilizing the neutron absorbing type of control described, with reference to Fig. 2. The neutron absorbing safety rod 2 is withdrawn from the active portion of the system 1, and with the limiting rod 5 fully inserted, the neutron absorbing control or regulating rod 4 is then slowly retracted until a galvanometer (not shown) connected with the ion chamber 3 indicates that the neutron density is rising. Should the neutron density fail to rise, the control rod 4 is reinserted and the limiting rod 5 withdrawn a slight amount, such as by one of the tapered pin position lengths. The control rod 4 is then slowly withdrawn and this sequence followed until the neutron density begins to rise by exceeding unity position of the control rod. If a slow rise is desired, the rod is retracted only just enough to indicate a rise. If a faster rise is desired, the rod is retracted further to increase the reproduction ratio in the system.

When any desired neutron density is reached, the control rod is pushed back into the pile until a point is reached at which the neutron density remains constant. At this point the system is balanced, with a neutron reproduction ratio of unity. No special source of neutrons is needed in the structure, as the natural neutrons always present and constantly diffusing through the pile are sufficient to start the reaction.

To again increase the neutron density, the control rod 4 is moved outwardly in such a manner and to such extent that neutron density rises at a desired rate and attains the new desired value and then the control rod is moved into the system to the point where the system is again balanced, thus stabilizing the reaction at the new neutron density. If it is desired to decrease the neutron density, the control rod is pushed into the system until the reproduction ratio is less than unity and the neutron density decays to the desired value. Then the control rod is retracted to the position at which balance is reestablished. In this manner, any desired neutron density within the heat dissipating limits of the structure may be obtained and maintained. The position of the control rod in the system therefore does not govern the neutron density in the pile, but only the rate of change of the density.

The unity reproduction ratio position of the control rod within the pile for maintaining any desired neutron density would always be the same were it not for the fact that the temperature within the pile changes to some extent and influences the neutron losses in the materials and also for the fact that in any pile exposed to atmospheric pressure, changes in the nitrogen content of the pile, accompanying changes in atmospheric pressure, change the K factor since nitrogen is an absorbing impurity. The unity reproduction ratio position of the control rod therefore changes slightly in accordance with the temperature at which the pile is being operated and with the atmospheric pressure. Changes due to atmospheric pressure are small but are of such magnitude that the position of the control rod can, if desired, be utilized to measure atmospheric pressure, to the extent that the nitrogen concentration in the pile can be taken as a measure of atmospheric pressure, as for instance when air circulation or other conditions are such that any oxidation reactions in the pile do not significantly change the constitution of the air therein. An exceptionally accurate barometric measurement can thus be obtained.

If, at any time, it is desired to stop the reaction, the control rod is inserted deep within the pile until the reproduction ratio becomes less than the value necessary to maintain the reaction with this size of structure. The neutron density then decays to that of the natural neutrons. The safety rods are also inserted when the pile is left unattended. The safety rods are pulled into the system by weights tripped by an emergency latch in case of failure of the control rod to control the reaction for any reason, as will be described in detail hereinafter.

An alternate method of control is to remove sufficient uranium from the pile, preferably from points close to the center, as illustrated in Fig. 3, to reduce the reproduction ratio to less than unity. This may be done by the use of the removable stringer 6 in the pile described, and the movement of the control stringer would be reversed with respect to the movements of the control rods described for control of the pile. In other respects, however, the action of a control stringer would be the same as the action of a control rod. The use of a control rod is preferred, however, as being simpler to operate and also because of radiation from the stringer.

It will be apparent that the above described method of control of the pile may be manual. While such manual control may be satisfactory for systems having obtainable reproduction ratios of only slightly over unity, such as 1.005, for example, it will not be satisfactory for systems having a reproduction ratio of a value approaching 1.01 in which cases the "delayed neutrons" are far less effective in preventing the neutron production from rising exponentially at a fast rate. An automatic control system is especially desirable for such systems, especially one which is not only responsive to the change of neutron density but to the rate of change of such density in the system.

Fig. 5 shows such an automatic control system. Referring to Fig. 5 numeral 1, as in Fig. 1, denotes the self-sustaining chain reacting system or pile, portions only of which are shown, numeral 2 denotes the safety mechanism, numeral 3 the neutron density responsive device, and numeral 4 the regulating or control mechanism. The safety mechanism 2 comprises a safety rod 7 of neutron absorbing material such as cadmium, boron, etc., or of material including substantial amounts of such neutron absorbing materials. The safety rod 7 is normally held withdrawn, that is, in a retrieved position with respect to the pile by an electromagnetically operated catch 8 which engages a chain 9 when the electromagnet coil 10 is energized. The details of the electromagnetically operated catch are better shown in Fig. 8 which will be described later. When the current in the coil 10 is interrupted either by manual interruption of the energizing circuit, or automatic interruption of said circuit as the result of excessive neutron density, the spring 68 as shown in Fig. 8 withdraws the catch from engagement with a cross link of the chain and allows a weight 12 to pull a cord or cable 13 (preferably of material which does not absorb neutrons appreciably) by gravity, and to pull with it the safety rod attached thereto into the pile 1 to stop the neutron chain reaction. While only one safety rod 7 is shown, it will be apparent that a plurality of such rods may be operated simultaneously. As the safety rod is pulled into the pile, a cam 14 integrally secured thereto will allow closing of limit switch 15 to partially complete an energizing circuit through a rewind motor 16. When it is desired to withdraw rod 7 from the pile, coil 10 is energized and a push button switch 17 is closed which completes an energizing circuit from a 115 volt alternating current power and feeder conductor 51 through rewind motor 16, which in turn will drive chain 9 and rod 7 so as to effect withdrawal or retrieving of the rod from the system or pile 1. During this time catch 8 is in engagement with chain 9 because coil 10 is energized. This retrieving action will continue until cam 14 effects opening of limit switch 15 at the limit of travel of the safety rod.

The regulating or control mechanism 4 (Fig. 5) comprises a regulating rod 18 of neutron absorbing material, such as cadmium, boron, etc., which likewise is insertable into the pile. Rod 18 has rigidly secured thereto a rack 82 which engages with a pinion 19 driven by a belt 20 either in one direction or another, depending upon whether motor 21 or motor 22 is furnishing the motive power. Motors 21 and 22 which may be series motors, for example, are mechanically coupled within the gear box 23, and together drive a pulley 24 either clockwise or counterclockwise. If motor 21 is energized to a greater degree than motor 22 it will drive rod 18 into the pile if to a smaller degree, motor 22 will drive it out of the pile. The use of two motors rather than a single reversible motor is for better adaptation to an automatic regulating circuit to be described hereinafter.

However, motors 21 and 22 may be controlled manually by a "Variac" having a split winding, that is, windings 26 and 27. Now, for example, when switch 57 is in its lower position and switch 101 and 102 are in the open position indicated in the drawing, the system is set for manual control through movement of the "Variac" knob 28. If the knob 28 is moved clockwise and in reacting relationship with winding 27 the energization of motor 21 is increased and the regulating rod 18 is driven into the pile, For this reason, the motor 21 may be termed the "in" motor. If the knob 28 is turned counter-clockwise and in reacting relationship with the winding 26, motor 22 is energized so as to cause outward movement of the regulating rod. For this reason, motor 22 may be termed the "out" motor. The speed at which motors 21 and 22, operate under such a manual control system, thus depends upon the setting of the knob 28 with relation to the windings 27 and 26 respectively. Under the manual control system, it is then clear that when one motor is energized the other is idle and is driven backward (i. e. in rotation) by the energized one. As will be more fully explained later, when the system is controlled automatically, the motors 21 and 22 are both energized, the rotation of the pulley 24 is determined by the relative energization of the motors, that is, if motor 21 is energized more than motor 22 the regulating rod 18 will be driven into the pile and the speed at which this action takes place depends on the relative energization of the two motors as imparted by the automatic control system.

Before describing the automatic features of the control system, it may be well to summarize certain general principles of such control. Firstly, the power developed in the system may be expressed in terms of neutron density in any portion of the system as measured. Since the temperature of the pile varies with neutron density, the controlling impulses may likewise be given by a temperature responsive device (not shown) such as thermocouples or the like. However, for our purposes, because of temperature lag, we prefer a neutron density responsive device such as an ion chamber.

When a neutronic reactor is controlled by neutron density, the following assumption is made, as an approximation:

$$\frac{dn}{dt} = K_1 x$$

where $dn/dt$ is the rate of change of neutron density, $x$ is the distance of the control rod from a neutral position at which the neutron density remains constant, and $K_1$ is a constant (not to be confused with the reproduction factor), the direction outward from the neutral position being considered as positive.

Suppose, then, that the control system is designed to move the rod at a speed partly proportional to the neutron density and partly proportional to the rate of change of density, i. e.:

$$\frac{dx}{dt} = -K_2(n - n_0) - K_3 \frac{dn}{dt}$$

The minus signs indicate that the control system opposes any change of neutron density; $n_0$ is the neutron density at which the reaction is to be stabilized. Differentiating this last equation, we obtain:

$$\frac{d^2x}{dt^2} + K_3 \frac{d^2n}{dt^2} + K_2 \frac{dn}{dt} = 0$$

Substituting from the first equation, we obtain:

$$\frac{d^2x}{dt^2} + K_1 K_3 \frac{dx}{dt} + K_1 K_2 x = 0$$

This is now an equation of motion for the control rod alone and it is possible to insert any initial condition in terms of an initial error in rod position and solve for the motion followed by the rod in correcting for this disturbance. It is found that if $K_3$ is greater than $$2\sqrt{\frac{K_2}{K_1}}$$

there will be no oscillation of the control, i. e., the response will be damped; if $K_3$ is equal to the stated expression, there will be critical damping; and if $K_3$ is less than the stated expression, there will be oscillation which, though damped, will permit undesired hunting by the control. The foregoing assumes that $K_2$ and $K_3$ are both positive, as otherwise the control will be unstable.

In the present system, the neutron density responsive device 3 of Fig. 2 comprises, as best shown in Fig. 5, an ion chamber 31 having an internal collecting electrode 32, and an external electrode or chamber 33, the latter of which is grounded. Such chamber is well-known in the art. Positive ions developed in the chamber as a result of neutron bombardment of the gas contained therein will travel to the collecting electrode 32 and resulting positive charges will flow to the amplifier 34, shown in block diagram form. By virtue of a battery 35 which is grounded, the amplifier is operated at a potential that is more negative than ground. The reason for doing this instead of using the more common type of amplifier operating at positive voltages is for convenience only, that is, the fact that it is more convenient to ground chamber 33 than to ground the electrode 32 of the ion chamber 31. By use of battery 36 in the output of the amplifier, the voltage is again made positive so as to provide a positive voltage impulse for the ensuing electronic circuit.

The output of the neutron density control device is passed to control mechanism 4 where the impulse or signal is amplified by vacuum tube $T_1$ and then passes through a network consisting of resistors 37 and 38, and condenser 39. A characteristic of this network is that over the range of possible frequency components of any reasonable disturbance or impulse it applies to the grid of the next tube $T_2$, a voltage given approximately by:

$$e_a = K_4 n + K_5 \frac{dn}{dt} + K_6$$

The constants of this equation are determined by the value of resistors 37 and 38, and of condenser 39, and the latter may thus be used to adjust the entire control system for stable performances.

Reverting to the control circuit 26—28, the windings 26 and 27 each have in parallel therewith a transformer primary 29 and 30 of transformers $Tr-1$ and $Tr-2$, respectively, upon closure of the manually controlled switches 101 and 102. Each of the transformers $Tr-1$ and $Tr-2$ has a secondary winding 40 and 41 respectively, across which two pairs of "thyratron" tubes 42 and 43 respectively, each pair forming a full wave rectifier, are so connected that when conducting, they shortcircuit the secondaries 40 and 41. The thyratron grid circuits are, however, arranged so that the amount of conduction, that is, the average conduction for any particular period, as for a half-cycle, may be continuously varied. This is accomplished by adding to the control potential, always supplied by tubes $T_2$ and $T_4$, an alternating current voltage of variable phase with respect to the thyratron plate voltage obtained from a transformer 44, operating through a phase shift network provided by variable resistor 45 and condenser 46. This adjustable alternating current is transmitted to the grids of thyratron tubes 42 and 43 through grid supply transformers 47 and 48 respectively. By varying resistor 45, thereby shifting the phase of the A. C. potential on the grid as compared to the phase of the A. C. potential on the plate of each respective thyratron tube, the point in time at which the thyratrons become conducting may be varied, thereby varying the period within any half cycle during which conduction occurs. In other words, the alternating current grid potential curve superimposed on the direct current biasing voltage curve obtainable from the output of tube $T_2$ or $T_4$ will give, at the point of intersection of such curves, the point in time at which conduction begins, and such point can be varied by varying resistor 45 of the phase shift network. Conduction ends generally at the end of the half cycle periods. The tubes of each pair alternately conduct current in a direction so as to provide continuous uni-directional current to the respective secondaries of the transformers $Tr-1$ and $Tr-2$. Tube $T_3$ produces an inversion of the control signal without amplification. Thus, changes in anode potential of $T_2$ are accompanied by equal and opposite changes at the anode of $T_4$.

For example, assume that the neutron density in the system has increased appreciably, thereby causing a substantial ion current to flow through the ion chamber. This current is amplified by amplifier 34 in a manner, as will now be apparent to those skilled in the art, such that a change of voltage in a positive direction is applied to the grid of tube $T_1$, the fixed bias on the grid of $T_1$ being determinable by the difference in voltage of the batteries 35 and 36. This will cause a negative voltage at both terminals of resistor 37 and a corresponding positive voltage on the plate of tube $T_2$. This positive voltage is applied to the respective grids of thyratron tubes 43. Since the grid of tube $T_3$ is directly connected to that of tube $T_2$ it will likewise be negative, causing both terminals of resistor 49 to be positive and causing the plate of tube $T_4$ to be negative. The effect of the positive voltage on the grids of thyratron tubes 43 and the negative voltage on the grids of thyratron tubes 42 will be to make tubes 43 conductive for a longer portion of the respective half cycles than tubes 42, or in other words, to effect a more conductive shunt across secondary winding 41 than across secondary winding 40. This will cause a greater current flow through primary winding 30 than through primary winding 29 whereby more energizing current will flow through the inward driving motor 21 than through the outward driving motor 22, assuming the switches 101 and 102 are closed as indicated above for automatic operation. The net effect will be that the motors 21 and 22 will rotate in a direction to move the regulating rod 4 inwardly until the neutron density of the system has decreased sufficiently so as to remove the positive voltage impulse from the grid of tube $T_1$.

Similarly, if the density of the system decreased appreciably so as to apply a negative voltage impulse to the grid of tube $T_1$ the output voltage of tube $T_2$ will be negative and that of tube $T_4$ positive causing greater conductivity through thyratrons 42 than through 43, effecting more current flow through the energizing circuit of the outward driving motor 22 than through the inward driving motor 21, thus causing outward movement of the regulating rod 18 until a condition of balance has again been attained.

The control system is responsive not only to the change of potential applied to the grid of tube $T_1$ but to the rate of change of such potential as well. The means responsive to such rate of change is the condenser 39 whose charging rate is dependent upon the rate of change of the potential imposed thereon. In this manner, the control system anticipates changes in neutron density, that is, it will cause a compensating control function appreciably before the change has fully taken place. In other words, if the neutron density should suddenly increase, the effect of condenser 39, responsive to the rate of change of the increase in neutron density, will be to control the potential on the grid of tube $T_2$ in a manner so as to cause insertion of the regulating rod 18 into the system an appreciable time before the neutron density has been given an opportunity to rise to an abnormally high value.

While the system just above described may be used to drive a control rod in or out of a chain reacting system, it will be obvious that the same mechanism can be utilized to drive a pump in opposite directions, as required, to raise or lower the level of a liquid moderator above or below the critical size, as pointed out in the prior description of Fig. 4.

Various safety and interlock features are incorporated in the control system to effect control of the chain reacting system with a maximum amount of safety in the event of emergency, such as, for example, an abnormal rise in neutron density in the system or power main failure. Assume manually operated switch 50 is closed, thereby completing an energizing circuit extending from feeder conductor 51 through various automatic or manually operated safety relay switches 52 through the switch 50 and relay coil 53 to ground, thereby causing closure of electromagnetically operated switch 54. This will set up a circuit extending from conductor 51 through switch 54, resistor 55 of high value, conductor 62, and coil 10 to ground. However, since resistor 55 is of high value, insufficient current will flow to effect attraction of armature or catch 8 by coil 10. However, as soon as the reset pushbutton 56 is closed thereby shunting the resistor 55, an appreciable current will flow through relay 10, thereby causing attraction of the armature or catch 8, which in turn will engage chain 9 and make it possible for the rewind circuit, including switch 17, limit switch 15 and driving motor 16, to withdraw safety rod 7 from the pile. In other words, unless switch 50 is closed and unless reset switch 56 is depressed it will be impossible to effect a rewind, that is, a withdrawal of safety rods from the pile.

Another safety feature is involved in the switch 57 which bridges the lower contact only when all the safety switches 52 are closed, so as to complete an energizing circuit extending through conductor 51 through safety switches 52, coil 58 to ground. When switch 57 is electromagnetically held against the lower contact, a circuit is completed extending from conductor 51 through transformer primary winding 30 to the inward driving motor 21 thence to limit switch 104 to ground so that the motor is controllable either by the electronic automatic control system or by the manual control system including winding 26 and 27. The energizing circuit is paralleled by and also includes primary winding 29 and motor 22 connected in series therewith, such winding also being paralleled by the manually operated Variac winding 26. If the feeder line 51 should be interrupted at any point, say at one or more of the safety relay operated switches 52, this will effect de-energization of coil 58 and bridging of the upper contact of switch 57 and completion of a circuit extending from conductor 51 through switch 57 (upper contact), motor 21, limit switch 104 to ground. This means that if any interruption occurs that may impair the safety of the operation of the system the inward driving motor 21 will be connected directly across the line so that the effect will be to directly energize and drive the regulating rod 18 inwardly into the pile to stop the reaction. In case of complete power failure it will be remembered that catch 8 will disengage from chain 9 so as to allow the weight 12 to pull the safety rod 7 into the pile or system to likewise stop the reaction.

Figs. 6 to 9 inclusive show the structural details of the safety rod operating mechanism. The safety rod 7 comprises strip of cadmium or cadmium containing steel 59 sandwiched between a steel strip 60 and a fiber strip 61. Secured above the fiber strip is a third rail 62, for example, of brass, serving as an electrical conductor for the energizing circuit of coil 10. The composite safety rod comprising the various strips described hereinabove is notched along its sides to accommodate a plurality of rollers 63 which ride along the upper edges of a U-shaped flange or track 64 extending along the bottom of the safety rod as will be more clearly apparent from a study of Fig. 9. It will be seen, therefore, that the safety rod will travel along the track with a minimum amount of friction, thereby insuring movement thereof in a minimum of time, less than one second, for example, when the safety rod is released by the catch mechanism described below.

Fig. 8 shows the details of the electromagnetically operated catch 8 showing how it is operated by knee action through a toggle mechanism 65. The knee action is adjusted so that it is not quite on the zero position when holding, thus the pull of both spring 68 and the weight 12 tend to release the catch. It will be apparent that when the coil 10 is energized, causing armature 66 to move to the right, carrying with it the knee of the toggle, it will cause lowering of catch member 8 onto one of the cross-links of chain 9 so as to effect driving engagement between chain 9 and the entire electromagnetically operated mechanism which is mounted on the end of the safety rod assembly 7 opposite the pile 1. This mechanism is rigidly secured to the top of the rod 7 and moves therewith. When coil 10 is de-energized, spring 68 will effect bending of the toggle mechanism and lifting of catch 8 out of engagement with chain 9. Since it is desirable to apply a braking action to the safety rod when it is near the limit of its movement inwardly into the pile, a brake 69 is provided comprising a pair of brake shoes 70 pivoted to links 71 forming, in effect, a parallelogram linkage. Springs 72 are provided for normally biasing brake shoes 70 slightly to the right so that when the corresponding friction shoes 73, rigidly secured to the sides of the safety rod, come into engagement with brake shoes 70 they will effect a straightening out in a vertical direction of the parallelogram linkages, causing binding of brake shoes 70 and friction shoes 73 thus retarding the motion of the safety rod to the left. However, as soon as the safety rod is moved to the right under the power of the rewind motor 16 brake shoes 70 are carried therewith, thus effecting movement of the parallelogram linkages to the right which causes disengagement between shoes 70 and 73.

Figs. 10 and 11 represent top and side views of a simplified form of the safety operating mechanism shown in Figs. 6 to 9 inclusive, wherein the parts are essentially similar with the exception of the type of brake used and the type of electromagnetically operated catch employed. A pair of springs 74 have their right end terminals rigidly secured to a suitable supporting structure, such as, for example, the pile, by suitable brackets (not shown), but have their left terminals secured to and bridged by cross bar 76 which is adapted to slide relative to its support members 75 secured to the pile. When a hook member 77 secured to the safety rod 7 comes into engagement with cross bar 76 near the limit of movement of the rod inwardly of the pile, the springs 74 will yield and offer resistance to the continued movement of the rod into the pile and therefore will effect a braking action thereof. The electromagnetic coil 10 attracts an armature 66a secured to a hook 8a which engages an opening 78 in the safety rod when coil 10 is energized. When de-energized, a spring 68a retracts the hook 8a from the opening so as to allow freedom of movement of the safety rod to the left by weight 12.

Figs. 12 to 16 inclusive show the details of the regulating rod operating mechanism. The regulating rod 18 may, for example, comprise a strip 79 of steel containing 1.5 percent boron (see Fig. 16) sandwiched between an upper steel plate 80, 1/16" thick, and a lower steel strip 81, 3/16" thick, the latter being rigidly secured to steel rack 82. The regulating rod is supported by a plurality of rollers 83 which ride on the upper edges of a U-shaped track 84 (see Fig. 15). On this track is also rotatably mounted a pinion 19 for applying motive power to the rack 82. Rollers 83, when within the pile, ride on shoulder members 85 (see Fig. 14).

Fig. 17 shows an indication circuit for giving a visual or recorded indication of the positions of the various rods at all times. For example, the safety rod position is indicated only at intervals by means of microswitches 86 aligned along its track. Closing of a particular microswitch will effect illumination of a particular indicator lamp 87 in circuit therewith energized through a transformer 88, such transformer being fed by the conductors 89 energized by a suitable source of alternating current potential. The regulating rod position is more accurately indicated by "selsyn" units shown schematically, comprising a selsyn generator 90 coupled to the regulating rod mechanism and connected to selsyn motors 91 and 92 operating a recording pin 93 and a dial indicator 94 respectively. With such an arrangement it has been found possible to set rod position within 0.05 inches of any desired value. An even higher degree of accuracy is possible by increasing the gear ratio between the selsyn units and rod mechanism. Location of the regulating rod in or out of the system is indicated by the "in" lamp 105 and "out" lamp 106 whose circuits to ground are completed through limit switches 107 and 108, respectively.

The limiting rod position similar to the safety rod is also indicated at intervals by micro switches 95, each of which is connected with one of a number of indicator lamps 96 energized by the conductors 89 through transformer 97. The microswitches have a plurality of sleeve-like members 98 cooperating therewith to accommodate a tapered pin 99. The sleeve like members are affixed with respect to the pile, and the pin 99, which passes through an opening in limiting rod 5, is selectively inserted in any of such sleeve like members so as to cause locking of the limiting rod in any particular position horizontally. As an added safety feature, a hinged cover plate 100 is provided to enclose the pin 99. Cover plate 100 may be locked by a padlock 101 so as to avoid tampering with the setting of the limiting rod by unauthorized persons.

Fig. 18 is a schematic showing of a modification of the safety rod operating mechanism described in Figs. 6 to 9, inclusive, and is in many respects, simpler. The gravity operated mechanism is the same, the brake is of the type disclosed in Figs. 10 and 11, but the rod retrieving mechanism is somewhat different. A motor 107 drives a worm gear 108 which in turn drives a worm wheel 109, the latter being directly connected to one of the driving elements of an electromagnetic clutch 110. The other clutch element is rigidly secured to a pulley 111 of the gravity operated safety rod inserting mechanism. A cable 120, which passes over pulley 111 is attached to the right-hand end of rod 7 and a weight 121 is suspended from the free end of the cable to keep it taut, weight 121 being less than weight 12. A source of alternating potential is used, rectified by full wave copper oxide rectifier 112, to provide direct current to the coils of the electromagnetic clutch. A release switch 113 is provided to interrupt the energization of the clutch.

Assume that the safety rod is inside the pile as shown in Fig. 18. By depressing a pull-out switch 114, a circuit is completed extending from the upper terminal of the alternating source through motor 107, limit switch 115, thence to the lower terminal of the alternating current source. This will effect a drive to the worm gear system 108–109 and clutch 110 in a direction to retrieve the safety rod from the pile. If it is desired to stop the retrieving movement, or at any time immediately stop the reaction in the pile, the release switch 113 is opened thereby interrupting the energization of the electromagnetic clutch coils, thereby uncoupling worm wheel 109 from pulley 111. This will allow the weight 12 at the left to pull the safety rod into the system. If it is desired to pull the safety rod all the way out of the pile, switch 114 is kept closed until limit switch 115 interrupts the motor energizing current. The safety rod will be held in such outward position due to its inability to drive the worm gear backward. An indicating circuit is also provided energized by a 6 volt source which illuminates the "in" lamp 116 through limit switch 117 when the rod is in the system. An "out" lamp 118 is illuminated by said source through the limit switch 115 while the rod is outside of the system. A suitable cam is affixed to safety rod 7, such as a camming surface 122 (as illustrated in Fig. 18), is provided along the underside of the rod for actuating the limit switch 115 when the safety rod is retracted, thereby opening the power supply circuit to motor 107 and simultaneously closing the circuit of lamp 118. Braking may be effected also by automatically actuating the clutch by any suitable means (not shown) when the rod has moved to near the limit of its inward movement of the system. This provides extremely smooth action since all shock is taken up in the friction drive between the pullout cable and its pulley.

It is therefore seen that we have provided an efficient control system for a self-sustaining nuclear chain reacting system embodying both manual and automatic features and embodying various safety and interlock features to make the operation of the system not only safe under both usual and unusual conditions, but also fool-proof.

While the theory of the nuclear self-sustaining chain reacting system set forth herein is based on the best presently known experimental evidence, we do not wish to be bound thereby, since additional experimental data later discovered may modify the theory disclosed. Any such modification or theory, however, will in no way affect the results obtained in the practice of the invention herein described and claimed.

While certain types of self-sustaining chain reaction systems have been described, illustrative of the application of our control system, it will be readily apparent that the control system may be used with other chain reacting systems with equal effectiveness. It will also be apparent that the above described control system may be modified without departing from the spirit and scope of the invention described.

Furthermore, it should be noted that the embodiments of our invention described and illustrated in the drawing are merely exemplary and should not be considered as limiting the invention inasmuch as our teachings will readily suggest alternate or equivalent structures to those skilled in the art hence, we wish to be limited only insofar as set forth in the following claims.

We claim:

1. In combination with a self-sustaining neutron chain reactor, a safety system comprising a neutron absorbing means, means for translating said neutron absorbing means along a path extending from the interior of the reactor to the exterior thereof comprising means exerting a force upon the neutron absorbing means directed toward the interior of the reactor, means for withdrawing and restraining said neutron absorbing means out of said reactor including a motor, an electromagnetic clutch connected between the motor and the force exerting means for coupling said motor to said neutron absorbing means, means to energize said clutch to keep said neutron absorbing means outside of said reactor, and means to deactuate the electromagnetic clutch, thereby resulting in the insertion of the neutron absorbing means into said reactor.

2. In combination with a self-sustaining neutron chain reactor, a safety system including a neutron absorbing means, means to translate said neutron absorbing means along a path extending from the interior of the reactor to the exterior thereof including a weight and a pulley system having a cable connected to the weight and to the end of the neutron absorbing means confronting the reactor for moving said neutron absorbing means into said reactor, and a control means for withdrawing said neutron absorbing means from the reactor comprising a motor, an electromagnetic clutch, a worm gear coupled to said motor, a worm wheel coupled to the driven side of said clutch, the driving side of the clutch being connected to the opposite end of the neutron absorbing means, and means connected to the clutch for controlling the clutch whereby the neutron absorbing means may be withdrawn or released at will.

3. The apparatus recited in claim 2 together with a limit switch in said control system, said limit switch being responsive to the complete withdrawal of said neutron absorbing means to stop said motor.

4. The apparatus recited in claim 2 in which said control system includes a source of alternating current for said motor, a rectifier having an input connected to the source and an output connected to the electromagnetic clutch to provide a source of direct current, a release switch connected between the source and the rectifier for interrupting the energization of said clutch to uncouple the motor from the neutron absorbing means and thereby permit the neutron absorbing means to be translated into the reactor by the gravity operated means.

5. In combination with a self-sustaining neutron chain reactor, a safety rod of neutron absorbing material, a gravity actuated means to translate said safety rod along a path extending from the interior of the reactor to the exterior thereof, a drive means including a motor and chain drive for retrieving said rod from said reactor, an electromagnetic means for holding said rod in said retrieved position, means in said reactor responsive to a given maximum neutron density to control the electromagnetic means to release the gravity actuated means for inserting the safety rod into the reactor, and a manually operable device for deactuating the electromagnetic means, thereby allowing said gravity actuated means to move said safety rod into said reactor.

6. The apparatus recited in claim 5 together with yieldable braking means for retarding said safety rod near the extreme limit of its path within said reactor.

7. The apparatus recited in claim 5 in which said electromagnetic means includes a catch insertable into a portion of said safety rod and held in such position when said electromagnetic means is energized, together with spring means for retrieving said catch from said rod portion when said electromagnetic means is deenergized.

8. In combination with a self-sustaining neutron chain reactor, a regulating rod of neutron absorbing material, means to translate said regulating rod along a path extending from the interior of the reactor to the exterior thereof including a first control means having a neutron responsive device disposed within said reactor, said control means controlling the position of the regulating rod along its path to maintain the neutron density in said reactor at a substantially fixed value, a safety rod of neutron absorbing material, means to translate said safety rod along a second path extending from the interior of the reactor to the exterior thereof including actuating means responsive to the neutron flux in the reactor to insert the safety rod into said reactor when a given maximum value of neutron density is reached, indicating means, generator means connected to said indicating means, said generator means being driven by said regulating rod to control the indicating means, a plurality of circuits, each circuit having a microswitch positioned in the path of the safety rod, and a lamp, whereby the position of the safety rod is indicated by the lamps.

9. In combination with a neutronic reactor system including a reactor, means for maintaining the neutron density in said reactor at a relatively constant operating level comprising means for producing a response monotonically related to the deviation of the neutron density from an operating level, and means controlled by the magnitude of said response for changing the neutron reproduction ratio in the direction of unity including a regulating rod made of neutron absorbing material, means for translating the regulating rod along a path extending from the interior of the reactor to the exterior thereof, said last means including a pair of electric motors, an energizing circuit therefor including transformers having primary coils connected to the motors and secondary coils, means having tubes connected across each secondary coil for shunting said coil, and control means for controlling said last means to shunt said secondary coils and to effect drive of said motors, said control means including circuit means being responsive to change as well as rate of change of the response.

10. In combination with a neutronic reactor system including a reactor, means for maintaining the neutron density in the reactor at a relatively constant operating level comprising means for producing a response monotonically related to the deviation of the neutron density from said constant level, and means controlled by the magnitude of said response for changing the neutron reproduction ratio in the direction of unity, said last means comprising a neutron absorbing control element, means for translating said control element along a path extending from the interior of the reactor to the exterior thereof, an electrical control system for actuating said translating means to move the control element along the path in either of two directions at variable speeds comprising a pair of electric motors, an energizing circuit including transformers having primary coils connected to said motors and secondary coils, means having vacuum tubes connected across the secondary coils for shunting said coils, and control means connected to the vacuum tubes for effecting control of said shunting means, thereby effecting the drive of said motors in certain directions, a source of alternating current for impressing alternating current potentials on said shunting means, a phase shifting means for varying the phase of said potentials, a source of variable direct current potential connected to said phase shifting means for biasing said alternating current potentials, said phase shifting means and said source cooperating to impress variable control potentials on the vacuum tubes of the shunting means to effect variation on their period of conductivity.

11. In combination with a neutronic reactor system including a reactor, means for maintaining the neutron density at a relatively constant operating level comprising means for producing a response monotonically related to the deviation of the neutron density from a constant level, and means controlled by the magnitude of said response and by the rate of change of said response for changing the neutron reproduction ratio in the direction of unity, said last means including a neutron absorbing control element, means for translating said control element along a path extending from the interior of the reactor to the exterior thereof, an electrical control system for actuating the translating means to move the control element in said reactor in either of two directions at variable speeds comprising a pair of electric motors, an energizing circuit therefor including transformers having primary coils and secondary coils, means for shunting the secondary coils including vacuum tubes connected across the secondary coils, and control means connected to the vacuum tubes for controlling the magnitude of the shunting of said secondary coils, thereby effecting the drive of said motors in certain directions, said control means including an ionization chamber and an electronic circuit connected to the ionization chamber, said circuit having a time responsive circuit including a condenser coupled between the ionization chamber and the shunting means.

References Cited in the file of this patent
UNITED STATES PATENTS

| | | |
|---|---|---|
| 353,305 | Henneberg et al. | Nov. 30, 1886 |
| 1,377,554 | Bloom | May 10, 1921 |
| 1,498,167 | Hill | June 17, 1924 |
| 1,877,605 | Shivers | Sept. 13, 1932 |
| 1,915,095 | Jump | June 20, 1933 |
| 2,206,634 | Fermi et al. | July 2, 1940 |
| 2,208,235 | Whitenack | July 16, 1940 |
| 2,371,415 | Tolson | Mar. 13, 1945 |
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |

OTHER REFERENCES

"Electric Lift Equipment for Modern Buildings," by Ronald Grierson, pub. by Chapman & Hall, Ltd., London (1923), Figure 1 of the frontispiece, pp. 53, 54, 55, 143.

Smyth: "Atomic Energy for Military Purposes," pp. 177–180, August 1945.

American Journal of Physics, vol. 20, No. 9 (December 1952), pp. 536 and 550–558.